United States Patent [19]
Batson

[11] Patent Number: 5,549,827
[45] Date of Patent: Aug. 27, 1996

[54] PROCESS FOR TREATING A SUSPENSION OF SOLID PARTICLES IN A CARRIER LIQUID

[75] Inventor: Richard G. Batson, Benoni, South Africa

[73] Assignee: Technology Finance Corporation (Proprietary) Limited, Transvaal Province, South Africa

[21] Appl. No.: 406,511

[22] Filed: Mar. 17, 1995

Related U.S. Application Data

[62] Division of Ser. No. 110,436, Aug. 23, 1993.

[30] Foreign Application Priority Data

Aug. 24, 1992 [ZA] South Africa ............................ 92/6368
Mar. 12, 1993 [ZA] South Africa ............................ 93/1794

[51] Int. Cl.⁶ .................................................. B01D 21/08
[52] U.S. Cl. ........................ 210/519; 210/521; 210/522; 210/540
[58] Field of Search .................................... 210/519, 521, 210/522, 532.1, 538, 540

[56] References Cited

U.S. PATENT DOCUMENTS 973,357  10/1910  Lewis et al. ............................ 210/519

(List continued on next page.)

FOREIGN PATENT DOCUMENTS

| 0260142 | 3/1988 | European Pat. Off. . |
| 72007 | 7/1903 | Germany . |
| 642281 | 2/1937 | Germany . |
| 3028686 | 5/1982 | Germany . |
| 427013 | 1/1934 | United Kingdom . |
| 435954 | 8/1934 | United Kingdom . |
| 964477 | 7/1964 | United Kingdom . |

OTHER PUBLICATIONS

"Mineral Processing Technology", 4th Edition, Wills BA Pergamon Press, 1988, pp. 651–665.
"Mass Transfer Operations", Treybal RE Second Edition, McGraw Hill Kogakuska Ltd., 1968, pp. 644–645.
"Industrial Water Pollution Control", Eckenfelder, W. W., McGraw Hill, Inc., 1989, p. 67.
"Water Supply and Pollution Control", 4th Edition, Viessmand W. Jnr and Hammer M. J., Harper and Row, New York, 1985, pp. 313–314.
"Elements of Water Supply and Wastewater Disposal", 2nd Edition, Fair G. M., Geyer J. C. and Okun D. A., John Wiley and Sons, 1971, pp. 379–380.
"Water Purification in the EEC", Water Research Centre, Pergamon Press, 1977, pp. 122–124, 142, 334 and 336.
"Water Treatment Plant Design", Sanks R. L., Ann Arbor Science, 1978, pp. 169–173, 199–201, 290–295, 302–307 and 176–179.
"Pollution Engineering Practice Handbook", Cheremisinoff P. N. and Young A. Y., Ann Arbor Science, 1975, pp. 453–457.
"New Concepts in Water Purification", Culp G. L. and Culp R. L., Van Nostrand Reinhold Co., 1974, pp. 30–36.
"Mineral Processing Technology", 4th Edition, Wills, B. P., Pergamon Press 1988, pp. 665–667.

*Primary Examiner*—Christopher Upton
*Attorney, Agent, or Firm*—Curtis Morris & Safford

[57] ABSTRACT

A process for treating a suspension of solid particles in a carrier liquid comprises subjecting the particles in the suspension to gravity settling in a treatment zone. The treatment zone has at least an upper free settling region in which free settling of solid particles through the liquid takes place, a hindered settling region below the free settling region in which hindered settling of particles takes place, and a compaction region below the hindered settling region in which the solid particles are in contact with one another so that a slurry is formed in this region. Clarified liquid is withdrawn from the free settling region. Liquid is allowed, in at least the compaction region, to move upwardly along at least one upwardly inclined pathway, while at least partially protected from settling solid particles. Slurry is withdrawn from the compaction region.

6 Claims, 5 Drawing Sheets

U.S. PATENT DOCUMENTS

| | | | |
|---|---|---|---|
| 1,262,076 | 4/1918 | Marston | 210/519 |
| 1,339,682 | 5/1920 | Allen | 210/801 |
| 1,526,197 | 2/1925 | Ahlqvist | 210/801 |
| 1,717,111 | 6/1929 | Marx | 210/801 |
| 2,793,186 | 5/1957 | Dunell et al. | 210/521 |
| 2,874,850 | 2/1959 | Unthank | 210/519 |
| 4,011,163 | 3/1977 | Fairbanks | 210/208 |
| 4,014,791 | 3/1977 | Tuttle | 210/519 |
| 4,151,084 | 4/1979 | Probstein et al. | 210/522 |
| 4,194,976 | 3/1980 | Robinsky | 210/521 |
| 4,197,201 | 4/1980 | Hjelmner et al. | 210/268 |
| 4,199,441 | 4/1980 | Ross | 209/44 |
| 4,451,359 | 5/1984 | Osterberg | 209/138 |
| 4,871,459 | 10/1989 | Titoff | 210/521 |
| 5,089,136 | 2/1992 | Cyr | 210/521 |

PROCESS FOR TREATING A SUSPENSION OF SOLID PARTICLES IN A CARRIER LIQUID

This application is a division of application Ser. No. 08/110,436, filed Aug. 23, 1993.

This invention relates to a process for treating a suspension of solid particles in a carrier liquid. It relates also to settling apparatus, to a separation device, and to fluid separating apparatus.

According to a first aspect of the invention, there is provided a process for treating a suspension of solid particles in a carrier liquid, which comprises subjecting the particles in the suspension to gravity settling in a treatment zone having at least an upper free settling region in which free settling of solid particles through the liquid takes place, a hindered settling region below the free settling region in which hindered settling of particles takes place, and a compaction region below the hindered settling region in which the solid particles are in contact with one another so that a slurry is formed in this region;

withdrawing clarified liquid from the free settling region;

allowing liquid, in at least the compaction region, to move upwardly along at least one upwardly inclined pathway, while at least partially protected from settling solid particles; and withdrawing slurry from the compaction region.

The solid particles thus have a higher density than the carrier liquid, and the process thus serves to thicken and deliquify the suspension, thereby forming the slurry. Separation of solid particles from the liquid takes place as the liquid moves along the pathway, thereby clarifying the liquid. The gravity settling in the treatment zone is effected under more-or-less quiescent conditions. In the free settling region, the particles thus settle independently and in unhindered fashion, with the settling rate mainly dependent on particle size. In the hindered settling region, the particles are sufficiently close to one another to restrict or hinder passage or egress of the liquid from between the particles. The particle settling rate decreases with increasing concentration of solid particles, and the settling rate is retarded by particle or floc interference. In the compaction region, the solid particles or flocs are generally in contact with one another, with consolidation or compaction of the slurry taking place in this zone as the intergranular contact pressures between the particles causes them to rearrange in closer formation or to deform. The rate at which the slurry thickens depends on, amongst others, the rate at which the liquid can be forced or 'squeezed out' from between the particles.

It is to be appreciated that the various regions are not necessarily sharply demarcated, and the regions can thus overlap. Furthermore, it is also known to categorize such a treatment zone into four categories: a dilute or Class 1 region; an intermediate or Class 2 region; a concentrated or Class 3 region; and a compact or Class 4 region, with the free settling region referred to above corresponding more-or-less to a combination of the Class 1 and Class 2 regions, the hindered settling region to the Class 3 region, and the compaction region to the Class 4 region.

Hitherto, such treatment zones have typically been provided by shallow circular tanks with central feeding of the suspension and predominantly horizontal radially outwardly flow within the tanks, and slowly rotating rakes in the hindered settling and compaction zones for moving the compacted sludge towards a central discharge point. However, these tanks have the drawbacks that they are maintenance intensive in view of the moving parts involved and require complicated control equipment to prevent mechanical and electrical overloading should the slurry become too thick to move. Furthermore, in view thereof that the ratio of their diameter to their height is large, ie they are shallow large diameter tanks, they do not effectively utilize the principal that the rate of consolidation of a slurry is proportional to the intergranular pressure between the slurry particles, ie low intergranular pressures only are utilized in such tanks. The process of the invention thus at least reduces these drawbacks.

The upward passage of the liquid along the pathway has, the Applicant believes, the effect of reducing pore pressures and increasing intergranular pressures, thereby enhancing consolidation or thickening of the slurry in the compaction zone.

The pathway may also extend into the hindered settling region and optionally even into the free settling zone. The pathway may be inclined at an acute angle of between 30° and 75° to the horizontal. The pathway may be provided along the underside of a continuous or discontinuous static inclined surface located in the compaction region and, optionally, in the hindered settling region, with the surface providing the protection against the settling solid particles. The pathway or channel is thus formed in the lee of the static inclined surface relative to the direction of the solids which are settling, ie moving with a vertical downwards component due to gravity settling and/or withdrawal of sludge from below the surfaces.

The process may include feeding the suspension into a feed zone in the free settling region, allowing the suspension to move down the feed zone with substantially no mixing thereof with the liquid in the free settling region, from a high level to a lower level, and allowing the suspension to exit the feed zone at the lower level.

The process may also include subjecting the suspension, at the lower level, to flocculation in a flocculating sub-region of the free settling region, with clarified liquid passing upwardly from the flocculating sub-region, and liquid containing flocs of the solid particles passing downwardly therefrom.

The process may further include allowing clarified liquid from the pathway to pass upwardly into the free settling region where it mixes with the liquid in this region. However, the liquid can instead pass upwardly through the liquid in the free settling region, with substantially no mixing thereof with the liquid in the free settling region, into the feed zone, thereby to dilute the feed suspension. The liquid passage or circulation thus results from the difference in specific gravities of the liquid in the pathway and in the various regions. The passage of the liquid may be effected along a passageway extending upwardly from the pathway.

The Applicant believes that, by keeping the clarified liquid out of contact with quiescent liquid in the compaction and hindered settling regions, disturbance of particles settling in these regions is inhibited, thereby enhancing slurry thickening or consolidation.

A plurality of the pathways, spaced vertically apart, with the liquid from each pathway passing upwardly to the feed zone as a separate stream, may be provided. Thus, inclined pathways may be provided in both the hindered settling region and the compaction region, and some pathways may extend from the compaction region to the hindered settling region. At least some of the pathways may extend parallel to each other. According to a second aspect of the invention, there is provided settling apparatus, which comprises a vessel providing a liquid treatment zone having at least an upper free settling region in which free settling of solid particles in suspension in a liquid introduced into the liquid treatment zone, through the liquid, can take place, a hindered settling region below the free settling region and in which hindered settling of particles can take place, and a compaction region below the hindered settling region in which solid particles will be in contact with one another so that a slurry is formed in this region;

feed means for feeding the suspension into the vessel;

clarified liquid withdrawal means for withdrawing clarified liquid from the free settling region of the vessel;

at least one static inclined surface in at least the compaction region of the vessel so that liquid can pass upwardly along an upwardly inclined pathway provided by the underside of the surface; and slurry withdrawal means for withdrawing slurry from the compaction region of the vessel.

A plurality of the static inclined surfaces, staggered vertically and/or horizontally, may be provided, and the surfaces may, as hereinbefore described, be inclined at an acute angle of between 30° and 75° to the horizontal. As also hereinbefore described, at least one of the surfaces may extend into the hindered settling region and, optionally, even into the free settling region; alternatively, or additionally, at least one static inclined surface may be provided in the hindered settling region and/or in the free settling region, this surface thus being spaced vertically from the static inclined surface(s) in the compaction region.

The vessel may comprise an upwardly extending peripheral wall defining the free settling and hindered settling regions, and a lower portion, tapering down from the peripheral wall to a slurry or thickened sludge outlet, with the lower portion defining the compaction region and, possibly, at least a portion of the hindered settling region. However, the location of the various regions in the vessel may vary. For example, the compaction region can extend to above the tapered portion of the vessel.

The vessel may, in particular, be cylindrical with the lower portion being of inverted conical shape, and generally with its height being greater than its diameter.

In one embodiment of the invention, the feed means may comprise at least one upright open-ended feed cylinder in the free settling region of the vessel, and a suspension feed conduit or fitting leading into the feed cylinder. The cylinder may extend down to near the bottom of the free settling zones. Instead, however, the feed means may comprise the feed means for feeding a suspension into separating apparatus, as described in South African Patent No. 88/0772, which is thus incorporated herein by reference.

Thus, as is disclosed in South African Patent No. 88/0772, the feed means may comprise a cylindrical member located in the free settling region of the vessel so as to define a subzone within the free settling region, and adapted to permit at least some separation of solid particles from carrier liquid therein on the suspension being fed into it, and a suspension feed conduit having a discharge outlet within the cylindrical member, for feeding the suspension into the cylindrical member.

The cylindrical member may then be mounted uprightly in the vessel, and may be open-ended so that solid particles and/or carrier liquid can pass downwardly from the subzone through an operatively lower opening of the cylindrical member. The cylindrical member may be of constant cross-sectional area along a major portion of its length, with its lower opening being of reduced cross-sectional area. The cylindrical member may hence taper down from said constant cross-sectional area to its lower discharge opening of reduced cross-sectional area, said tapered down portion thus constituting restriction means at the lower end of the cylindrical member.

The feed means may then also include a distribution head attached to the conduit, with the distribution head thus providing said discharge outlet. The distribution head may be adapted to feed the suspension substantially horizontally into the cylindrical member. More particularly, the distribution head may be adapted to spray the suspension into the cylindrical member in a substantially horizontal plane at a spray angle of between 10° and 360°.

The distribution head may comprise a distribution plate spaced from the conduit discharge outlet, with the feed conduit discharge outlet directed upwardly or downwardly and lying substantially on the axis of the vessel. Suspension flowing from the discharge outlet can thus impinge on the distribution plate, thereby to be sprayed radially outwardly. A second distribution plate may be provided around the discharge opening. The second distribution plate will thus be spaced from the other or first distribution plate. The distribution plates may extend substantially horizontally, and together constitute the distribution head. The distance between the plates may be variable. By varying the distance between the plates, the radial velocity can be altered. This will promote even radial distribution of the suspension, and well as provide adjustability to optimize conditions for ortho-kinetic flocculation, i.e. collision and adherence, of the suspended solid particles in the subzone.

In another embodiment of the invention, the feed means may comprise a feed well located in the free settling zone, with the lower end of the feed well being closed off; a suspension feed conduit or fitting leading into the feed well; and at least one suspension discharge outlet in the bottom of the feed well.

The apparatus may include a flocculating device connected to the or each feed well suspension discharge outlet, and located above the compaction zone, with the flocculating device adapted to discharge clarified water upwardly and flocculated solids downwardly towards the compaction zone. The flocculating device may also be similar to the feed means of South African Patent No. 88/0772 hereinbefore referred to.

Thus, as is disclosed in South African Patent No. 88/0772, the flocculating device may also be similar to the feed means hereinbefore described, i.e. comprising an open-ended upright cylindrical member adapted to permit at least some separation of solid particles from carrier liquid therein.

The clarified liquid withdrawal means may comprise a nozzle or outlet in the wall of the vessel, an overflow weir, a distribution plate or the like.

Passageway defining means, eg a conduit, may lead upwardly from an upper edge of at least the uppermost static inclined surface, into the feed well so that, in use, clarified water passes from the underside of the surface over its upper edge, along the conduit, and into the feed well.

Each inclined surface may be provided by a hollow open-ended static conical separating member, with the conical separating members thus being spaced apart vertically and the downwardly facing surfaces of the separating members providing the static inclined surfaces. A clarified liquid outlet may then be provided at the apex of each separating member. The conduit is thus located around the outlet of the uppermost separating member. The apices of the separating members may be upwardly directed, and the separating members may be located concentrically within the vessel. Instead, however, they can be inclined at any other desired angle to the horizontal, as hereinbefore described.

In one embodiment of the invention, the conduit may extend upwardly from an upper edge of only the uppermost separating member, and clarified water may then, in use, pass from one inclined surface to the next.

However, further conduits, each leading from the apex of one of the other separating members and terminating with clearance from the separating member immediately above it, may be provided. However, preferably, further conduits, each leading from the apex of one of the other separating members, into the feed well so that, in use, clarified liquid from each separating member is discharged into the feed well and admixed with feed suspension, may be provided.

In another embodiment of the invention, a plurality of vertically spaced and/or horizontally spaced inclined static separating members may be provided in the compaction zone, with downwardly facing surfaces thereof providing the static inclined surfaces. The downwardly facing surfaces may be planar, may extend parallel to the sides of the conical portion of the vessel, and may be arranged radially in the vessel. Instead, the separating members may be channel-shaped or angle-shaped located in inverted fashion in the vessel so that they face downwardly. They may then be located parallel to the sides of the conical portion, and my be arranged in radial fashion as hereinbefore described. A plurality of 'layers' of the members, with the members of one layer spaced from those of an adjacent layer, and possibly with the members of one layer being staggered circumferentially with respect to those of an adjacent layer, may be provided.

In yet another embodiment, a plurality of upwardly extending concentrically located static spiral separating members may be provided in the compaction region, with downwardly facing surfaces of the spirals providing the static inclined surfaces. The separating members may then be arcuate shaped in cross-section with their concave surfaces being downwardly directed, and constituting the static inclined surfaces, so that the water channels extend alongside the concave surfaces.

According to a third aspect of the invention, there is provided a separation device for separating a fluid into a relatively light fraction and a relatively heavy fraction, the device comprising a separating member having an operatively upwardly directed surface as well as an operatively downwardly directed surface, and adapted for mounting statically in a gravity settling vessel, such that the downwardly directed surface is inclined at an angle to the horizontal; and a conduit leading from the separating member and being in communication with the downwardly directed surface of the separating member, the conduit arranged to be upwardly directed from an upper end of the separating member when the separating member is mounted in the vessel.

The separating member may, as hereinbefore described, be of hollow open-ended conical form having an outlet at its apex and a skirt flaring outwardly from the apex, with the conduit mounted around the outlet; a plurality of the hollow open-ended conical separating members, spaced apart from one another with the apex of one separating member located within the skirt of an adjacent separating member, may be provided; and a conduit for each conical separating member, each conduit leading from the outlet of a different separating member, and all the conduits terminating approximately the same distance beyond the operatively uppermost separating member, may also be provided.

The conduits may be located concentrically within one another.

The included angle of all the separating members may be substantially the same, and the diameter of the separating members may increase progressively from the operatively uppermost separating member.

According to a fourth aspect of the invention, there is provided. fluid separation apparatus for separating a fluid into a relatively light fraction and a relatively heavy fraction, the apparatus comprising a vessel in which a fluid can separate into light and heavy fractions under gravity;

feed means for feeding the fluid into the vessel;

light fraction withdrawal means for withdrawing the light fraction from the vessel at a relatively high level;

heavy fraction withdrawal means for withdrawing the heavy fraction from the vessel at a relatively low level; and a separation device as hereinbefore described, located in the vessel such that the downwardly directed surface(s) of its separating member(s) are inclined at an angle to the horizontal, and with its conduit(s) extending upwardly.

The feed means may, as hereinbefore described, comprise a feed well located above the uppermost separating member, with the lower end of the feed well being closed off; a feed conduit leading into the feed well; and at least one discharge outlet in the bottom of the feed well, with the conduit(s) of the separation device terminating in the feed well. Instead, the feed well, feed conduit, and at least one flocculating cylinder as hereinbefore described, may be provided in a separate clarification vessel, with the separation device then being provided in a separate thickener vessel. The unthickened slurry from the clarifier can then be gravitated or pumped into the top of the thickener vessel, while 'clarified' liquid from the thickener vessel can flow under gravity into the feed well of the clarifier vessel.

The fluid separation apparatus can be used to treat a suspension of solid particles in a carrier liquid, as hereinbefore described. Instead, however, it can be used for degassing liquids, in which case the difference in density between the liquid and gas or foam phases causes separation of the gas or foam from the liquid phase. Yet further, the apparatus can be used to separate solids from a liquid, where the specific gravity of the solids is less than that of the carrier liquid. Still further, the apparatus can be used to separate two liquids of differing densities, where the liquids are not mutually soluble in each other.

The invention will now be described by way of example with reference to the accompanying diagrammatic drawings in which FIG. 1 shows a vertical sectional view of settling apparatus according to a first embodiment of the invention;

Figure 1:
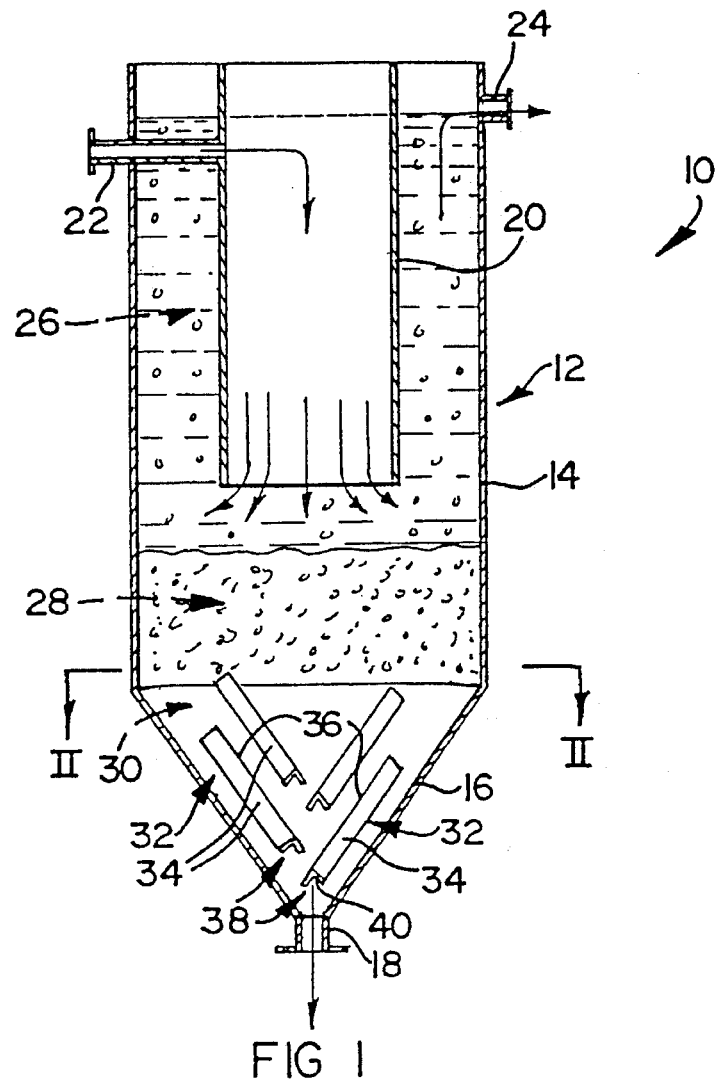
Figure 2:
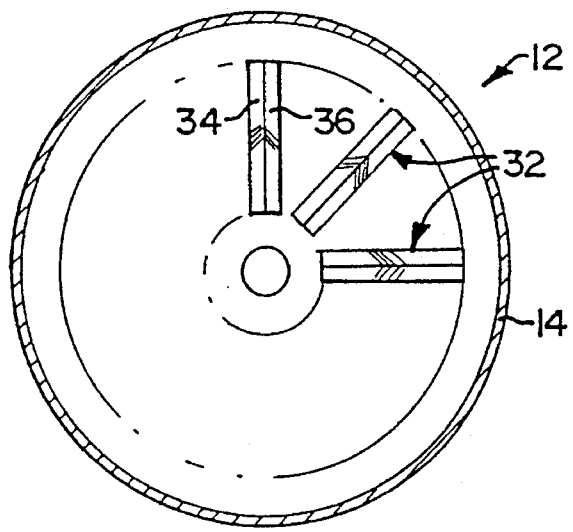
FIG. 2 shows an sectional view through II—II in FIG. 1.
Figure 3:
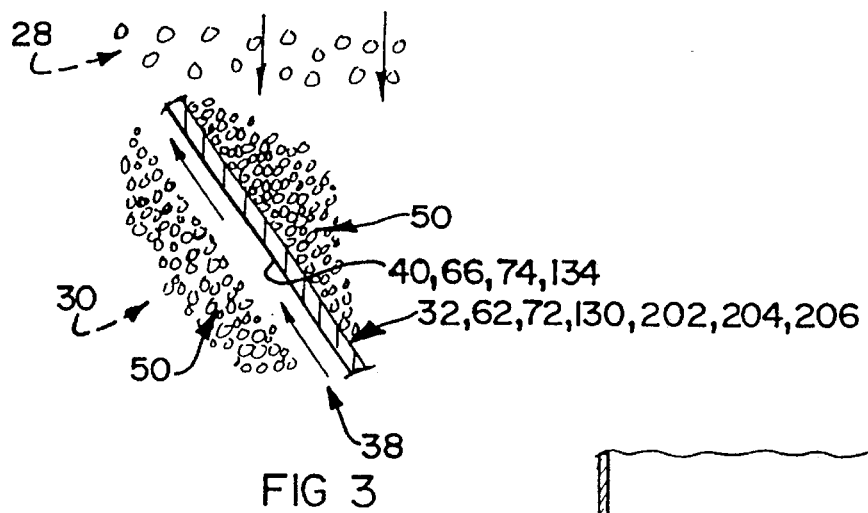
FIG. 3 shows an enlarged sectional view of part of the, or one of the, separating members of FIGS. 1, 4, 6, 7 and 8, in use.

Referring to FIGS. 1 to 3, reference numeral 10 generally indicates settling apparatus according to a first embodiment of the invention, for thickening and deliquifying a suspension of solid particles in a carrier liquid. The density of the solid particles is greater than that of the liquid.

The apparatus 10 comprises a vessel generally indicated by reference numeral 12. The vessel 12 is circular in plan view and has a cylindrical wall 14 and a lower portion 16 of inverted conical shape. A thickened sludge outlet 18 is provided at the apex of the lower portion 16. An axially extending feed cylinder 20 is located within the vessel 12, with a suspension feed conduit 22 leading into the feed cylinder. A clarified liquid outlet 24 is provided in the wall 14 near its upper end.

The vessel 12 provides a treatment zone comprising an upper free settling region 26, an intermediate hindered settling region 28, and a lower compaction region 30. The region 30 is located within the conical vessel portion 16; however, the regions need not necessarily be exactly as indicated, but can vary in practice. For example, the region 30 can terminate above the vessel portion 16. Moreover, there will, in practice, not necessarily be a sharp demarcation between the regions, with the one region overlapping with an adjacent region.

The settling apparatus 10 also includes a plurality of static or fixed channel or angle shaped separating members 32 located in inverted fashion in the lower portion 16 of the vessel 12, mounted by means of brackets (not shown) to the vessel. The members 32 are arranged radially, and extend parallel to the lower portion 16 of the vessel. A number of 'layers' of the members 32 are provided, with the members of one layer being spaced vertically from those of an adjacent layer, and with the members of one layer being staggered circumferentially with respect to those of an adjacent layer. Instead, however, only one layer of the members 32 can be used. Each member 32 comprises a pair of sides 34, 36 having downwardly directed inclined planar surfaces 40 defining between them an inclined channel 38 along which the water pathways extend. The members 32 are inclined at between 30° and 75° to the horizontal, typically between 45° and 60° to the horizontal.

In use, a suspension of the solid particles in the carrier liquid enters the vessel 12 through the conduit 22. By means of the feed cylinder 20 which extends down to near the bottom of the free settling region 26, the suspension is distributed downwardly and radially outwardly. Conditions within the vessel are more-or-less quiescent so that it functions as a gravity settler, ie gravity thickening and deliquifying occurs therein. In the free settling region 26 free settling of the solid particles through the body of liquid takes place. In the region 28 hindered settling of the particles occur as hereinbefore described, while in the compaction region 30 a slurry is formed, with consolidation or compaction of the slurry taking place due to the intergranular contact pressure between the particles. The pore pressure is reduced, the intergranular pressure is increased, and hence compaction or dewatering of the slurry is enhanced by means of the separating members 32.

Referring in particular to FIG. 3, underneath each downwardly directed inclined surface 40, there is provided the inclined water pathway 39 as hereinbefore described and along which liquid can escape upwardly through slurry 50 in the region 30, substantially unhindered by settling solid particles. In this fashion, deliquifying and thickening of the slurry, is enhanced.

Typically, the liquid of the suspension is water, while the solid particles are an impurity such as soil, a precipitate or the like. Thus, the slurry may be turbid underground water from a gold mine or the like.

Instead of the feed means constituted by the components 20, 22, feed means as described hereinafter with reference to FIGS. 9 and 10 can be used, as is described in South African Patent No. 88/0772.

Parts of the settling apparatus hereinafter described with reference to FIGS. 4 to 8 and which are the same or similar to those of the apparatus 10, are indicated with the same reference numerals.

Figure 4:
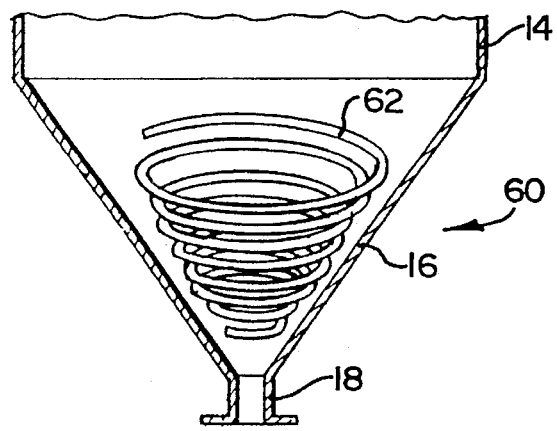
FIG. 4 shows, in part, a vertical sectional view of settling apparatus according to a second embodiment of the invention.
Figure 5:
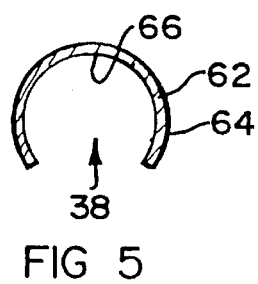
FIG. 5 shows a cross-sectional view of one of the separating members of the apparatus of FIG. 4.

Referring to FIG. 4 and 5, reference numeral 60 generally indicates settling apparatus according to a second embodiment of the invention.

The apparatus 60 includes a plurality of static upwardly extending concentrically located spiral-shaped separating members 62 in the portion 16 of the vessel. Instead, however, only a single separating member 62 may be used. The members 62 are arcuate shaped in cross-section and thus have upwardly directed convex surfaces 64 and downwardly directed concave surfaces 66. The concave surfaces 66 thus provide the static inclined surfaces along which the water pathways 38 are defined.

Figure 6:
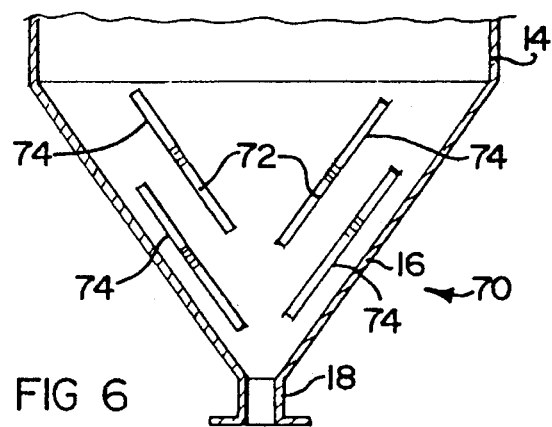
FIG. 6 shows, in part, a vertical sectional view of settling apparatus according to a third embodiment of the invention.

Referring to FIG. 6, reference numeral 70 generally indicates settling apparatus according to a third embodiment of the invention.

The apparatus 70 comprises a plurality of static planar separating members 72 pointing upwardly and inwardly towards the centre of the vessel. As mentioned hereinbefore, they can be located at any other acute angle, typically between 30° and 75°, eg 45° to 60°, to the horizontal. The members 72 are also located radially, and can be provided in one or more layers, with the members of one layer being spaced from those of the next layer. Each member 72 has an undersurface 74 which is the static inclined surface along which the water pathway 38 is provided.

Figure 7:
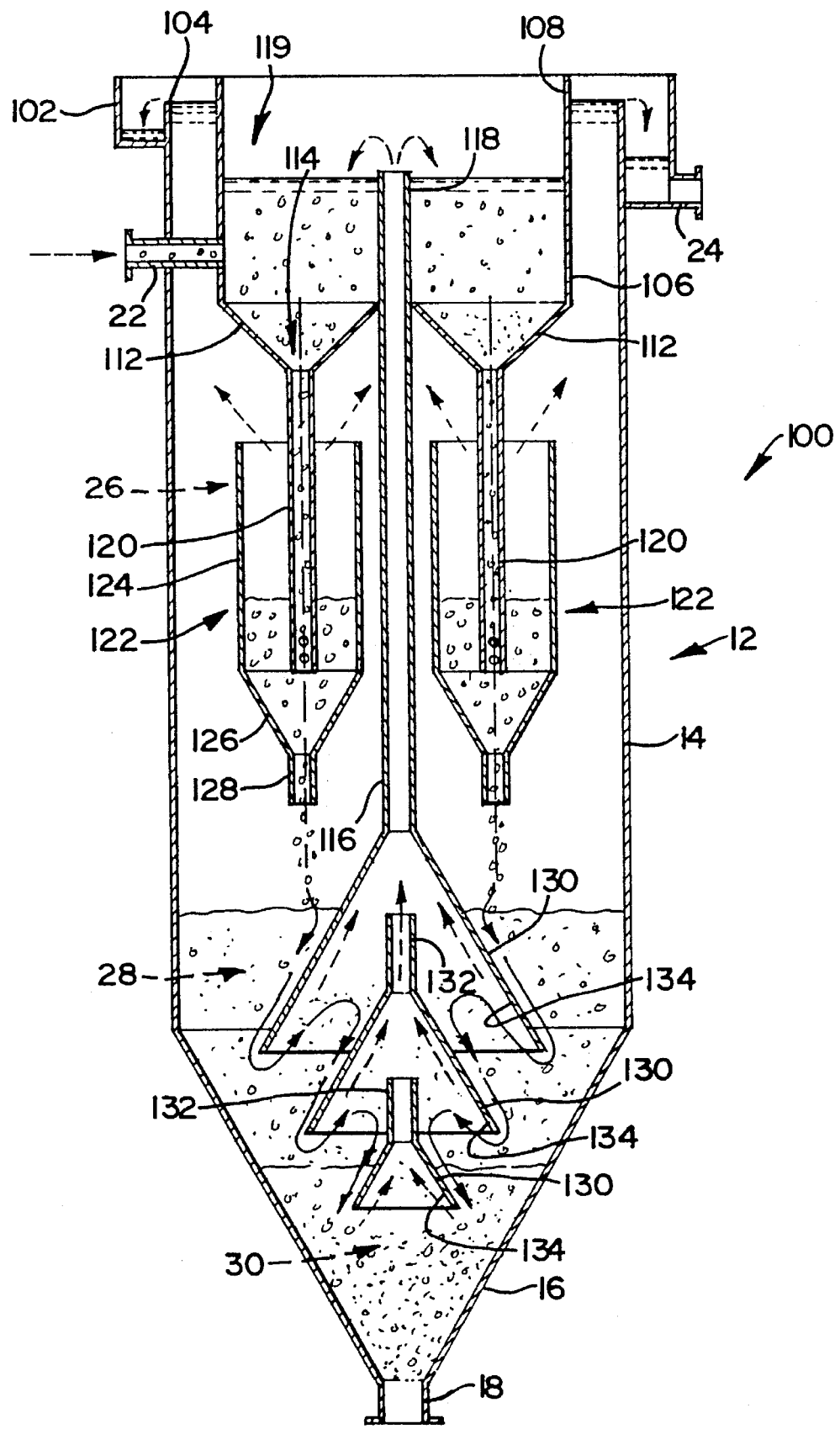
FIG. 7 shows a vertical sectional view of settling apparatus according to a fourth embodiment of the invention.

With reference to FIG. 7, reference numeral 100 generally indicates settling apparatus, according to a fourth embodiment of the invention.

An overflow channel 102 extends peripherally around the upper edge 104 of the cylindrical wall 14, so that the upper edge 104 constitutes a weir. The clarified liquid outlet 24 is provided in the channel 102.

A feed well 106 is located concentrically within the cylindrical wall 14 at the top of the vessel 12, with the upper edge 108 thereof being located at the same level as the upper edge of the channel 102. The suspension feed conduit 22 leads into the well 106. The floor of the feed well is provided with circular openings, with inverted hollow open-ended conical portions 112 depending downwardly from the feed well floor around these openings. A greater or lesser number of openings and portions 112 can be provided, if desired. For example, only one such opening and portion may be provided. A suspension outlet 114 is provided at the apex of each of the conical portions 112. A conduit 116 is located axially within the vessel 12 and extends through the centre of the feed well floor. Its upper end 118 is located at a lower level than the upper edge 108 of the feed well 106. The conduit upper end 118 is thus located in a feed or mixing zone 119 provided by the feed well 106. The purpose of the conduit 116 will be described in more detail hereunder.

From the apex of each of the conical portions 112, around the opening 114, depends a conduit 120. The conduits 120 terminate in flocculating devices or cylinders, each generally indicated by reference numeral 122. Each flocculating cylinder 122 comprises a cylindrical wall 124, an inverted hollow open-ended conical shaped lower portion 126 around the lower edge of the wall 124, and a sleeve-like component or restriction pipe 128 depending downwardly from the apex of the conical portion 126 and providing a suspension outlet. The ratio of the area enclosed by the cylindrical wall 124 to that of the restriction pipe 128 is typically between 25:1 and 100:1. The conduits 120 extend to the level of joints of the walls 124 and conical portions 126 of the flocculating cylinders 122. Each of the flocculating cylinders 122 is the same as, or similar to, the feed means hereinafter described with reference to FIGS. 10 and 11.

The region 30 and a portion of the region 28 may be located within the conical portion 16. Instead, the region 30 may occupy the entire portion 16, and may even extend some way up the cylindrical portion of the vessel 12. The feed well 106 and flocculating cylinders 122 are generally located within the region 26.

The apparatus 100 also includes a plurality of static hollow open-ended truncated conical separating members or dewatering cones 130 spaced apart from each other so that they nestle partly within each other. The diameters of the cones 130 decrease from the top downwardly. Instead, their diameters can increase from the bottom upwardly. They can even all be of the same size. A greater or lesser number of cones can be provided. For example, a single cone may instead be provided. The included angle of the cones is the same, and is between 30° and 75°, preferably between 45° and 65°, typically about 60°. A conduit 132 protrudes upwardly from each of the cones 130, around its outlet or opening of its apex, except for the uppermost cone 130 from which the conduit 116 protrudes. The upper end of each conduit 132 terminates with clearance from the cone 130 immediately above it. Each cone 130 provides a static circumferentially extending downwardly directed inclined surface 134.

In use, a suspension of solid particles in carrier liquid enters the mixing zone 119 through the conduit 22. The suspension may be a fairly thick slurry, or a liquid containing only a few parts per million suspended solids. A flocculant can be added to the mixing zone 119, if desired, in which case the mixing zone may be fitted with a mixer (not shown). Instead, the flocculant can be added to the suspension before it reaches the apparatus 100. In the mixing zone 119, the suspension is admixed with clarified water passing upwardly along the conduit 116, as described in more detail hereunder. The more dilute suspension is distributed evenly throughout the well, and flows downwardly through the conduits 120 into the flocculating cylinders 122 where flocculation of the suspended particles occurs, with most of the suspension being forced upwardly. It is believed that, within the flocculating cylinders 122, conditions for orthokinetic flocculation are favourable, and particle collisions take place within the restrained floc bed until the flocs become large and heavy enough to settle against the imposed upward velocity, and then escape through the restriction pipes 128 into the lower part of the apparatus 100. The free-flow nature of the cylinders 122 inhibits blocking thereof. Clarified water passes upwardly out of the flocculating cylinders 124 to be withdrawn as overflow by means of the channel 102 and the outlet 24. A more concentrated suspension, containing larger particles generally in the form of flocs, thus exits the flocculating cylinders 122 via the outlets 128 and enters the hindered settling zone 28.

At high suspension feed flow rates the upward velocity in the flocculating cylinders 122 increases, the bed depth increases, more collisions take place between the flocs and the flocs increase in size until they are, in turn, heavy enough to settle against the flow. By this means the flocculating cylinders 122 are able to operate over a wide range of flow rates. Changes in feed suspended solids levels are also accommodated automatically. At high suspended solids levels collisions are very frequent and the large flocs develop quickly and then escape. At low suspended solids levels collisions are scarce and therefore the hydraulic residence time of the solids inside the flocculating cylinders increases.

Conditions within the regions 26, 28 and 30 are, as hereinbefore described, more-or-less quiescent so that the vessel 12 functions as a gravity settler, ie gravity thickening and deliquifying occurs therein. Adjacent the inclined surfaces 136 of the cones 130, ie on the lee sides thereof, the inclined water pathways 38, along which liquid, under the influence of the higher density of solids, can escape upwardly through the slurry substantially unhindered by settling solid particles, are formed. Separation of particles from liquid occurs in the pathways 38, and beneath each cone 130. In this fashion, liquid is clarified by the cones 130, and deliquifying and thickening of the slurry is enhanced.

Clarified liquid which collects at the apices of the cones 130 is transported upwardly first along the conduits 132, and then along the conduit 116, into the mixing zone 119. There it is admixed with the incoming suspension to dilute it.

Upward movement of clarified water along the conduit 116 is provided by the differences in density or specific gravity of the liquid in the various components. For example, the incoming suspension can typically be a suspension of solid particles in water, with the suspension typically having a specific gravity (SG) of about 1,3. The SG of the clarified water passing upwardly along the conduit 116 is thus about 1 while the SG of the water in the feed well 106 and the flocculating cylinders 122 as well as in the regions 28, 30 is greater than 1. As deliquifying and thickening of the slurry takes place in the regions 28, 30, its specific gravity increases, providing a greater driving force urging the clarified water up the conduit 116.

More specifically, when the apparatus 100 is first started up, a fairly thin slurry sinks to the bottom and rises within each dewatering cones 130. Separation starts to take place with the water rising towards the apex of each cone while the partly dewatered slurry, which is now that much denser, passes downwards and slides down the upper surface of the next lower cone. The 'partial vacuum' created is filled by fresh slurry from above.

At this stage the system is hydrostatically out of balance. Typically the feed slurry might have a relative density of, say 1,3. The feed/mixing well 106, the conical portions 112, feed pipes or conduits 120 and the lower tapered portions or sections 126 of the flocculating cylinders are filled with slurry. Similarly the lower part of the vessel 12 is also filled with slurry of increasing density.

There is then only a small layer of water between the bottom of the flocculating cylinders 122 and the top of the sludge bed. However, in contrast, the dewatering discharge conduit or pipe 116 is filled with water, with possibly a few suspended solids. The resulting pressure imbalance causes a flow upwards in the dewatering discharge pipe 116. This leads to an accelerated dewatering and thickening of the slurry as the released water is 'pumped' from the cones 130 into the feed/mixing well 106. This process is continuous and is powered by the heavy solids which continually enter the top of the vessel 12 and which continually displace water as they drop to the bottom of the unit.

The dewatering system provided by the cones 130 is self regulating. As water is drawn out of the slurry between the dewatering cones 130 a point is reached when most of the free water has been removed, and light solids are taken up with the water. The solids content of the water in the dewatering discharge pipe 116 increases, the out of balance hydrostatic pressure decreases, the flow slows down, and hydrodynamic equilibrium is reached. At this stage, which is reached within minutes, the dewatering pipe is discharging a thin slurry into the feed/mixing well 106. This dilutes the feed suspension in the well and in the flocculating cylinders, rapidly stabilising the flow pattern.

This internal recycle also has effects other than merely accelerating the dewatering and thickening of the slurry.

The first effect is due partly to already flocculated solids being mixed with the incoming suspension in the feed/mixing well. This results in savings in flocculants as the flocculated solids naturally already contain flocculant. The dilution of the feed slurry, even with clear water, results in further substantial savings in the costs of flocculants. This effect is related to the better distribution of flocculant in a more dilute suspension.

Possibly of even greater benefit, in terms of solid/liquid separation, is the improvement in the efficiency of the operation of the flocculating cylinders 122. Instead of the suspension or slurry passing straight through, the lower apparent viscosity allows the water to separate from the solids, a proper floc bed is formed and the water exits from the top of the flocculating cylinders whilst the large flocs are discharged, as and when they are large enough, through the lower tapered restriction pipes 128.

It will be appreciated that the level of the liquid in the mixing zone 119 will on start-up, assuming that the vessel 12 is filled entirely with substantially clear water, be opposite the upper edge 104 of the wall 14. However, once equilibrium has been achieved within the system with thickened slurry being withdrawn continuously through the outlet 18, suspension being fed continuously through the inlet 22 and clarified water being withdrawn continuously through the outlet 24, the level in the mixing zone 119 will be as indicated in the drawing.

With high suspension or slurry feed densities, without any dilution, the slurry would tend to pass directly down through the feed pipes 'en masse' and very little separation would take place. The necessary dilution to allow separation is provided automatically in the apparatus 100.

The apparatus 100 can also be used for the clarification and thickening of liquids containing only a few parts per million of suspended solids. In this application, the difference in density between the slurry in the feed/mixing well 106, feed pipes 120 and flocculating cylinders 122 and the liquid in the dewatering discharge pipe 116 is very small, and this part of the system provides very little 'pumping' or accelerated thickening effect. However, as the suspended solids gradually build up in the lower conical portion 16 of the vessel 12 and as this slurry is dewatered underneath the cones 130, a difference in density is gradually built up between the slurry around the dewatering cones and the central dewatering discharge pipe 116, which is filled with liquid. The effect is to drive this liquid up the discharge pipe and into the feed/mixing well while more slurry enters underneath the cones to take the place of the ejected water and the thickened slurry, which due to its increased density, has dropped further down into the conical portion 16 of the vessel 12.

As before, liquid exiting from the dewatering cones 130 will pick up solids, increasing the density of the liquid travelling up the dewatering pipe 116 until dynamic equilibrium is reached between the pressures due to the difference in densities and friction losses, mainly in the dewatering pipe.

The solids content of the liquid exiting from the dewatering pipe could be higher than the solids content of the feed suspension. Thus, instead of diluting the incoming feed, the internal recycle actually increases the suspended solids level.

This can have benefits as follows: firstly flocculated solids are re-used, often decreasing the amount of flocculant used, secondly ortho-kinetic flocculation is enhanced with a higher floc volume concentration and thirdly the recycled flocs can aid in precipitation in such processes as lime softening.

In another embodiment (not shown), the cones 130 may be inverted, with an annular clarified water passageway adjacent the vessel wall 14, instead of the conduit 116, then being provided. A combination of upwardly directed and inverted cones can also be used, if desired.

In addition, the flocculating cylinders 42 are optional and can be dispensed with if desired. However, it is believed that efficacy is enhanced when using at least one cylinder 122. Furthermore, a greater number of flocculating cylinders 122 can be provided, each connected to a conical portion 112 of the feed cylinder. For example, four such cylinders spaced equidistantly apart circumferentially may be provided, and a baffle (not shown) may then be provided between adjacent flocculating cylinders if desired, with the baffles then extending radially outwardly from the conduit 116 to the wall 14. Instead, however, only one flocculating cylinder 122 may be used.

If the density of the solids in the feed suspension or slurry is only slightly greater than that of the carrier liquid, a larger number of cones 130 can be used in a very deep compaction region, to increase the out-of-balance pressure which drives dewatering, as hereinbefore described.

Figure 8:
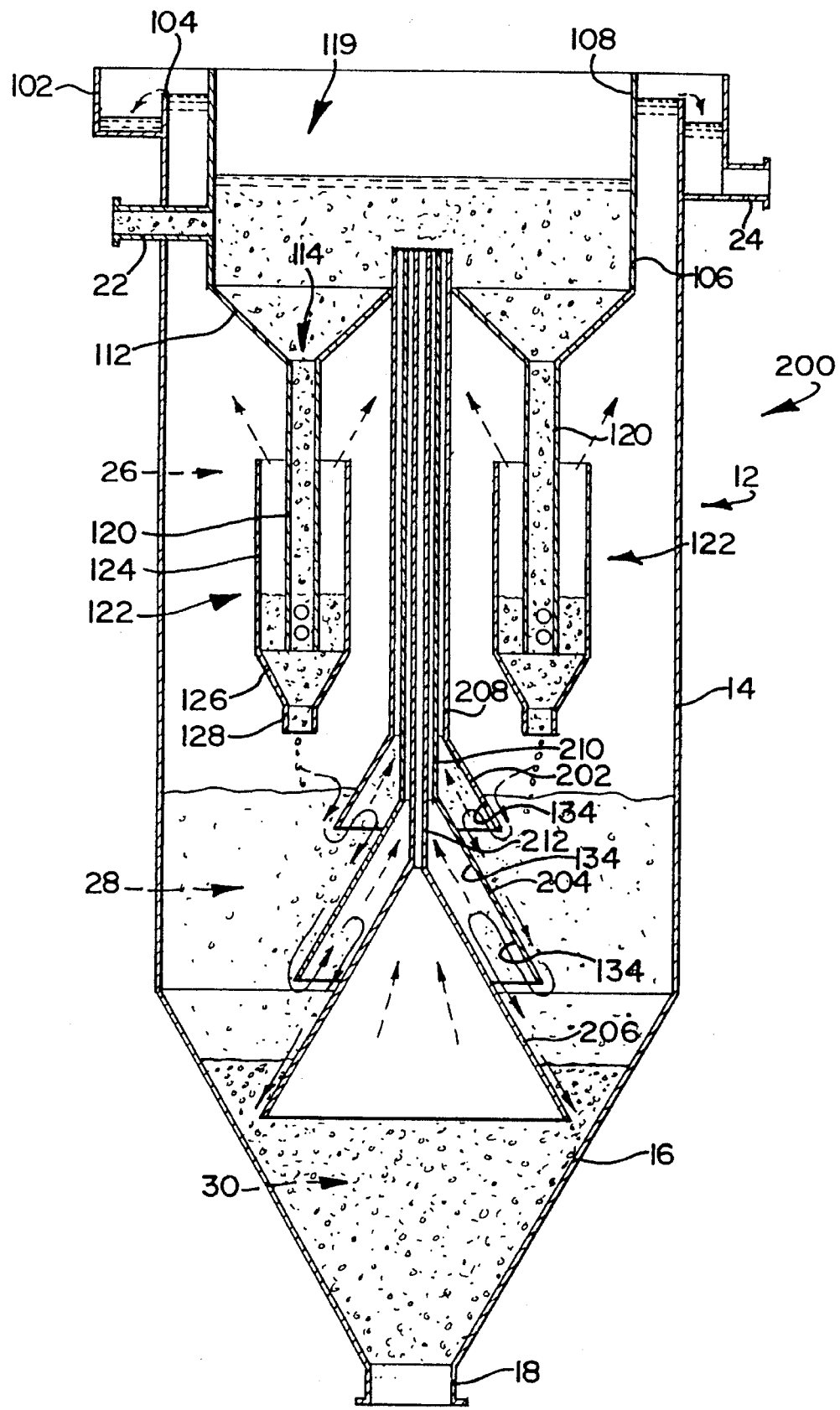
FIG. 8 shows a vertical sectional view of settling apparatus according to a fifth embodiment of the invention.

Referring to FIG. 8, reference numeral 200 generally indicates settling apparatus according to a fifth embodiment of the invention.

The apparatus 200 includes a plurality of static hollow open-ended truncated dewatering cones 202, 204, 206 spaced apart from one another and nestling partly within one another. The lowermost cone 206 has the largest cone base diameter, with the uppermost cone 202 having the smallest cone base diameter, ie the diameter of the cones increases from the uppermost cone to the lowermost cone. A conduit 208 leads upwardly from the outlet of the cone 202, a conduit 210 from the cone 204, and a conduit 212 from the cone 206. The conduits are of different diameters with the conduit 212 located concentrically within the conduit 210, which in turn is located concentrically within the conduit 208. Each of the conduits 208, 210, 212 is thus similar to the conduit 116 of the apparatus 190. The upper ends of the conduits terminate in the feed well 116.

The upper cones 204, 202 are 'stepped' to cut down the sloping length of the upper cone surfaces and to provide controlled dewatering beneath each cone as soon as possible after the flocs leave the flocculating cylinders 122. It is believed that dewatering on the upper surface of a large cone could result in the release of trapped water from the slurry as the slurry tumbles down the slope. This released water would pass upwardly against the descending flocs, possibly creating instability of the hindered settling region.

The apparatus 200 functions in similar fashion to the apparatus 100, save that clarified or partly clarified water from each of the cones 202, 204 and 206 is conveyed separately along a conduit to the feed well 106. Thus, dynamic equilibrium is reached independently between each cone/conduit combination and the surrounding settling solids.

The Applicant believes that with the apparatus 100, 200 in which the conduits 116, 208, 210, 212 ensure that upwardly flowing clarified water does not disturb the quiescent settling conditions in the regions 26, 28 and 30, good separation of solid particles from liquid will be obtained. Thus, the apparatus 100,200 act as combined clarifiers and accelerated thickeners capable of handling very high flow rates and low flocculant dosages to produce clear overflow and high underflow densities. The apparatus 100, 200 have no moving parts, and require little maintenance.

Figure 9:
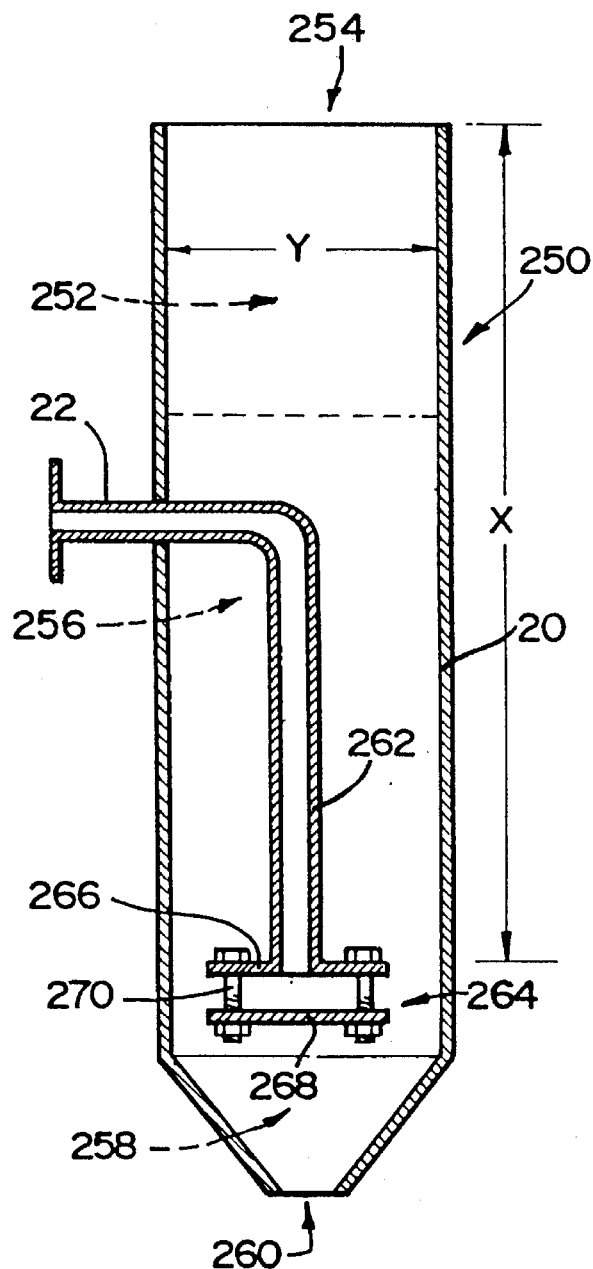
FIG. 9 shows a vertical sectional view of alternative feed means for use in the settling apparatus of FIG. 1.

Referring to FIG. 9, reference numeral 250 generally indicates alternative feed means for use in the settling apparatus of FIG. 1.

Parts of the feed means 250 which are the same or similar to those of the feed means of FIG. 1, are indicated with the same reference numerals.

Thus, the feed means 250 also comprises the axially extending circular section feed cylinder or cylindrical member 20 located vertically and co-axially inside the vessel 12. The cylinder 20 has an upper region 252 having an upwardly directed liquid discharge opening 254, an intermediate region 256, and a lower tapering region 258 having a particulate material discharge opening 260.

The feed means 250 also includes the suspension feed conduit 22 which extends into the intermediate region 256 of the cylinder 20. The cylinder 20 is thus located in position by being attached to the conduit 22. A free end 262 of the conduit is directed downwardly, and is located on the axis of the cylinder 20. A distribution head, generally indicated by reference numeral 264, is attached to the free end 262 of the conduit 22. The distribution head 264 comprises a first annular distribution plate 266 around the free end 262 of the conduit, and a second circular distribution plate 268 spaced from the plate 266. The distribution plates are spaced apart from each other by means of spacer nut and bolt assemblies 270. By means of the nut and bolt assemblies 270, the distance between the distribution plates can be varied.

In use, the suspension of solid particles in carrier liquid is fed radially into the cylinder 20 through the conduit 22 and the distribution head 264. A relatively high degree of turbulence or mixing will occur in the cylinder 20, in particular in its intermediate region 256, while relatively quiescent conditions will prevail in the remainder of the free settling region 26 around the cylinder 20. In the cylinder 20, agglomeration of particles takes place so that larger particles or flocs are formed. The cylinder 20 will be sized so that, for a particular feed rate, the upward velocity of the liquid in the cylinder 26 is greater than the average settling velocity of the agglomerated particles or flocs, i.e. the settling velocity of average sized agglomerated particles or flocs. These agglomerated particles or flocs will hence have a relatively low upward velocity along the cylinder 20, while the upward velocity through the cylinder 20 of smaller particles having a lower settling velocity, will be greater. This enhances collision of the smaller particles and the agglomerated particles or flocs, leading to the formation of yet larger flocs. These larger flocs are carried out at the upper end of the cylinder 20 and settle down to the hindered settling region 28 by passing through the quiescent liquid around the outside of the cylinder 20 in the free settling region 26 of the vessel 12.

The tapering region 258 of the cylinder 20 ensures that there is little downward movement of liquid or suspension in the cylinder 20, but permits coarse particles of material to drop through its opening 260 into the hindered settling region 26.

The ratio of the distance "X" which the distribution head 264 is located below the discharge opening 254 of the cylinder 20, and the diameter "Y" of the cylinder 20 can be between 5:1 and 10:1.

In another embodiment (not shown), particularly suitable for relatively small vessels, the distribution head 264 may be replaced by another distribution means, for example a T-fitting, with branches of the T extending substantially horizontally.

Figure 10:
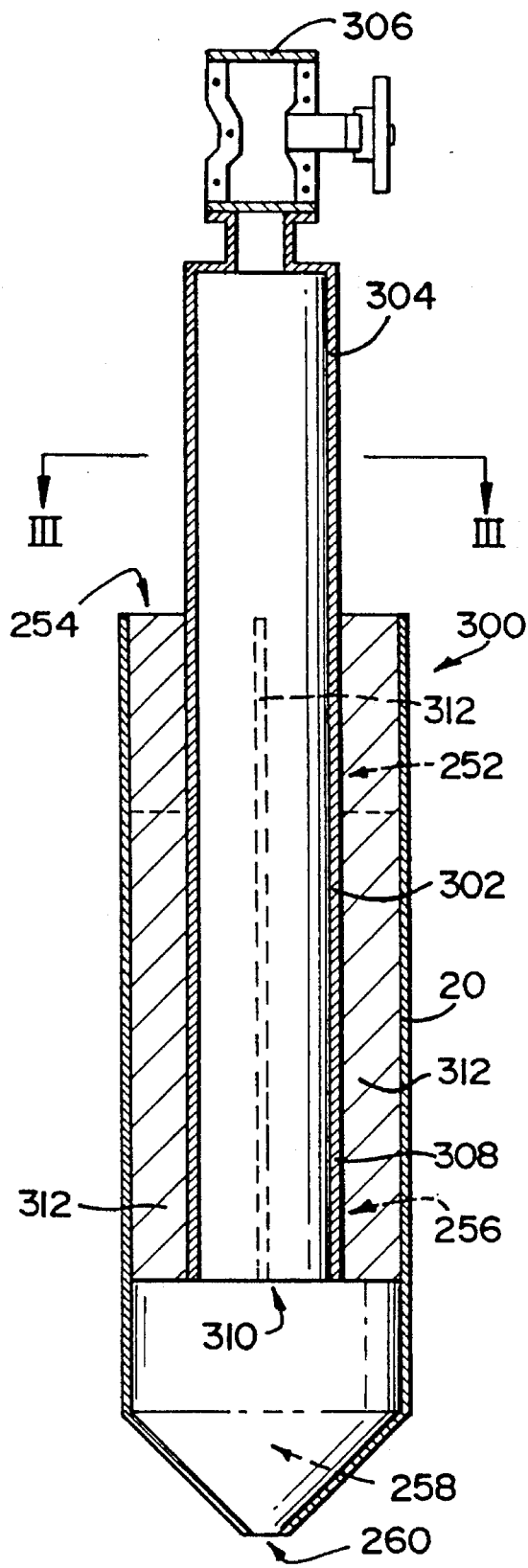
FIG. 10 shows a vertical sectional view of a yet further alternative feed means for use in the settling apparatus of FIG. 1.

Referring to FIG. 10, reference numeral 300 generally indicates yet further alternative feed means for use in the settling apparatus of FIG. 1.

Parts of the feed means 300 which are the same or similar to those of the feed means of FIGS. 1 and 9, are indicated with the same reference numerals.

The feed means 300 includes a vertical feed conduit 302 extending co-axially with the cylinder 20, with its upper end 304, in use, protruding from the upper end of the vessel (not shown) to which the feed means will be fitted. To its upper end 304 is fitted a suspension feed rate control valve 306, e.g. a pinch valve. A lower end 308 of the conduit 302 provides a discharge opening 310 and is located within the intermediate region 256 of the cylinder 20. The discharge opening 310 is downwardly directed.

The conduit 302 is fixed to the cylinder 20 by means of circumferentially spaced, radially outwardly protruding plates or baffles 312.

A series of tests were carried out on a pilot plant based on the settling apparatus of FIG. 8, save that only a single flocculating cylinder 122 was used. The apparatus included four separating or dewatering members 130. The conduits leading from the apices of the separating members were in the form of separate pipes, with the upper end of each pipe terminating in the feed well 106. The pilot plant was constructed from fibre reinforced plastics ('FRP') and clear PVC, so that the functioning of the apparatus could be seen clearly. The vessel 12 was cylindrical, having a diameter of 477 mm, and its lower portion 16 had an included angle of 60°. The total height of the vessel was 4,5 m.

The diameter of the flocculating cylinder 122 was 300 mm, and it was also fabricated from clear PVC. The inside diameter of the restriction pipe 128 was 34 mm.

The major diameter of each of the separating members 130 was 300 mm, and their included angle was 60°. The conduits leading from the apices of each of the members were of 50 mm internal diameter. The members 130 were spaced 100 mm apart, measured perpendicularly between the cones.

TEST 1 - Thickening of Backfill Reject Material

Backfill reject material from a dewatering cyclone overflow was fed, at a controlled rate, into the feed well 106 of the pilot plant. A non-ionic polyacrylamide was added into the feed chamber to flocculate fine suspended solids in the slurry.

Withdrawal of thickened underflow or slurry through the outlet 18 was effected at a steady controlled rate using a variable speed peristaltic pump. This applied also to the other tests hereinafter described.

The feed size distribution of the backfill reject was measured as:

|  | Passing |
| --- | --- |
| <270 μm | 100 |

-continued

|  | Passing |
|---|---|
| <75 μm | 75 |
| <45 μm | 60 |
| <25 μm | 50 |
| <16 μm | 40 |
| <10 μm | 30 |

| Feed flow rate through the inlet 30 | 2,83 m³/h |
|---|---|
| Upflow velocity across the vessel portion 14 | 15,84 m/h |
| Relative density of the feed entering through the inlet 30 | 1,1 to 1,36 |
| Underflow rate through outlet 18 | 0,55 to 1,02 m³/h |
| Relative density of underflow through outlet 18 | 1,4 to 1,52 |
| Flocculant addition | 40 g/ton of solids |
| Suspended solids in clarified water or overflow withdrawn through the outlet 24 | 21 to 68 mg/l |

During the test, water with a low solids content from the conduits attached to the dewatering cones, could be seen rising through the slurry in the feed chamber 106 indicating that extensive dewatering was taking place. This water could be seen to be diluting the incoming slurry feed.

The pilot plant worked well over a fairly wide range of feed relative density values (1,1 to 1,36) producing acceptable overflow clarities and underflow densities generally above 1,45.

Performance of the pilot plant apparatus was satisfactory in terms of ease of operation and control.

TEST 2 - Thickening of Coal Fines

A slurry of coal fines in water, emanating from an HMS (Heavy Media Separator) plant was fed at a controlled flow rate into the feed well 106 of the pilot plant. A non-ionic polyacrylamide was added into the feed chamber to flocculate the fine suspended solids in the feed slurry.

The following results were obtained:

| Feed flow rate through the inlet 30 | 4.40 m³/h |
|---|---|
| Upflow velocity across the vessel portion 14 | 24,64 m/h |
| Relative density of the feed entering through the inlet 30 | 1,03 |
| Underflow rate through outlet 18 | 0,68 m³/h |
| Relative density of underflow through outlet 18 | 1,15 |
| Flocculant addition | 24 g/ton of solids |

During this test, water with a low solids content from the conduits attached to the apices of the dewatering cones, could be seen to rise through the slurry in the feed chamber 106 indicating that extensive dewatering was taking place. This water could again be seen to be diluting the incoming slurry feed.

The pilot plant apparatus was found to be insensitive to feed rate fluctuations and feed density fluctuations. Start-up and stoppages were handled quickly and flexibly, and the apparatus reached operational stability very quickly.

TEST 3 - Recovery and Thickening of Regenerated Carbon Fines

The feed for this test consist of water containing regenerated carbon fines, colloidal silica and calcium precipitates in various proportions. This stream emanated from the regeneration of activated carbon in a gold recovery stage. The solids were present as a suspension in the water. The suspension was fed into the feed chamber 106 at a controlled rate. A non-ionic polyacrylamide was mixed with the feed suspension to flocculate the fine suspended solids in the feed suspension.

Clarification and thickening of the feed was found to be highly dependent upon the proportion of fine carbon, colloidal silica and calcium precipitate in the feed.

After optimization the following results were obtained:

| Feed flow rate through the inlet 30 | 1,5 m³/h |
|---|---|
| Upflow velocity across the vessel portion 14 | 8,4 m/h |
| Feed solids content | 400 mg/l |
| Relative density of underflow through outlet 18 | 1,05 to 1,08 |
| Flocculant addition | 1,2 mg/l |
| Suspended solids in clarified water withdrawn through the outlet 24 | 70 mg/l |

In order to achieve good clarification and thickening, it was found necessary to adjust the diameter of the restriction pipe 128 of the flocculating cylinder 122 until, at the desired flow rate, the flocculating cylinder was almost filled with a bed of flocs of the particles. This ensured a high orthokinetic flocculation efficiency.

TEST 4 - Clarification Thickening of ROM Mill Cyclone Overflow

ROM (Run of Mine) mill cyclone overflow was fed, at a controlled rate, into the feed chamber 106. A non-ionic polyacrylamide was added into the feed chamber to flocculate the fine suspended solids.

The following results were obtained after optimizing the flocculant dosage:

| Feed flow rate through the inlet 30 | 3,3 m³/h |
|---|---|
| Upflow velocity across the vessel portion 14 | 18,4 m/h |
| Relative density of the feed entering through the inlet 30 | 1,15 |
| Underflow rate through outlet 18 | 0,7 m³/h |
| Relative density of underflow through outlet 18 | 1,45 to 1,8 |
| Flocculant addition | 5 g/ton of solids |
| Suspended solids in clarified water withdrawn through the outlet 24 | <100 mg/l |

With a high flocculant addition of 40 g/ton, the feed flow rate could be increased to 5,5 m³/h. This test thus showed that very high feed flow rates can be accommodated in the apparatus of the invention under exceptional conditions, at the expense of additional operating costs. Underflow density and overflow clarity remained within the same range.

Upsets to the pilot plant caused by interruptions in flocculant dosage or cessation of the underflow pump caused deterioration in the clarity of the overflow water within 15 minutes. However, correction of the fault restored normal operation in less than 15 minutes.

The Applicant further believes that the settling apparatus according to the invention has at least the following advantages:

settling apparatus or thickeners according to the invention can operate at much higher flow rates per unit plan area, eg at least double that of known thickeners such as cylindrical continuous gravity thickeners fitted with rotating rakes, deep cone thickeners and the like, at lower flocculant dosages. This is due to the very high rate at which liquid is removed from the hindered settling region and the compaction region by forces resulting from the differences in SG ('specific gravity') of different regions within the thickeners of the present invention.

since the static dewatering or separating members of the invention operate effectively not only in the hindered settling zone, but also in the compaction zone, very deep compaction zones can be accommodated, resulting in the production of much higher underflow densities than can be produced by known thickeners as hereinbefore described.

clarification and thickening regions are provided in a single vessel. This results in clear overflows with high underflow densities.

since separation of liquid from slurry takes place on the underside of one or more widely spaced static inclined members, rather than between closely spaced plates, the apparatus is not prone to blockage.

specific conduits are provided to direct liquid from the dewatering surfaces back to the feed well. Gravity settling can therefore take place without settling solids being disturbed by liquid, released from lower zones, rising within the settling zone, thereby allowing higher feed rates without degrading the clarity of the overflow; density is not an important design parameter.

recirculation of water from the static surfaces through the conduit(s) dilutes high density slurries resulting in lower flocculant dosages due to better flocculant distribution and mixing, and better solid/liquid separation. This leads to lower flocculant dosages and enhanced overflow clarities.

reseeding of flocs with the liquid emanating from the dewatering surfaces can also lead to lower flocculant dosages, faster precipitation, and in the case of very low feed solids concentrations, higher floc volume concentrations and more effective ortho-kinetic flocculation.

the absence of any moving parts in apparatus according to the invention reduces capital costs, and operating and maintenance costs; furthermore it is not prone to breakdowns normally associated with moving parts.

the thickeners of the invention require a very short start-up time before operating to specification; large conventional thickeners require many hours to reach steady state conditions.

I claim:

1. Settling apparatus, which comprises a vessel providing a liquid treatment zone having at least an upper free settling region in which free settling of solid particles in suspension in a liquid introduced into the liquid treatment zone, through the liquid, can take place, a hindered settling region below the free settling region and in which hindered settling of particles can take place, and a compaction region below the hindered settling region in which solid particles will be in contact with one another so that a slurry is formed in this region;

a plurality of static inclined surfaces, staggered vertically and/or horizontally, in at least the compaction region of the vessel so that liquid can pass upwardly along upwardly inclined pathways provided by the undersides of the surfaces, with the surfaces being inclined at an acute angle of between 30° and 75° to the horizontal, and with at least one of the surfaces extending into the hindered settling region;

a feed well located in the free settling region, with the lower end of the feed well being closed off;

a suspension feed conduit leading into the feed well;

at least one suspension discharge outlet in the bottom of the feed well;

a flocculating device connected to the feed well suspension discharge outlet, and located above the compaction region, the flocculating device adapted to discharge clarified water upwardly and flocculated solids downwardly towards the compaction region;

a conduit leading upwardly from an upper edge of at least the uppermost static inclined surface, into the feed well so that, in use, clarified water passes from the underside of the surface over its upper edge, along the conduit, and into the feed well;

clarified liquid withdrawal means for withdrawing clarified liquid from the free settling region of the vessel;

slurry withdrawal means for withdrawing slurry from the compaction region of the vessel.

2. Apparatus according to claim 1, wherein each inclined surface is provided by a hollow open-ended static conical member, with the conical members thus being spaced apart vertically and the downwardly facing surfaces of the members providing the static inclined surfaces, and with a clarified liquid outlet being provided at the apex of each member, the conduit thus being located around the outlet of the uppermost static inclined surface.

3. Apparatus according to claim 2, which includes a further conduit leading from the apex of each of the other conical members, into the feed well so that, in use, clarified liquid from each conical member is discharged into the feed well and admixed with feed suspension.

4. Fluid separation apparatus for separating fluid into a relatively light fraction and a relatively heavy fraction, the apparatus comprising a vessel in which a fluid can separate into light and heavy fractions under gravity;

a separating member having an upwardly directed surface as well as a downwardly directed surface statically mounted in the vessel such that the downwardly directed surface is inclined at an angle to the horizontal;

a conduit leading from the separating member and being in communication with the downwardly directed surface of the separating member, the conduit being directed upwardly from an upper end of the separating member;

a feed well located above the separating member, with the lower end of the feed well being closed off and with the conduit from the separating member terminating in the feed well;

a feed conduit leading into the feed well;

at least one discharge outlet in the bottom of the feed well;

light fraction withdrawal means for withdrawing the light fraction from the vessel at a relatively high level; and heavy fraction withdrawal means for withdrawing the heavy fraction from the vessel at a relatively low level.

5. Fluid separation apparatus according to claim 4, wherein the separating member is of hollow open-ended conical form having an outlet at its apex and a skirt flaring outwardly from the apex, with the conduit mounted around the outlet.

6. Fluid separation apparatus according to claim 5, which comprises a plurality of the hollow open-ended conical separating members, spaced apart from one another with the apex of one separating member located within the skirt of an adjacent separating member, with the feed will being located above the uppermost separating member, and with a conduit leading from the outlet of each separating member, and all the conduits terminating in the feed well.

* * * * *